US012717876B2

(12) United States Patent
Schütz et al.

(10) Patent No.: US 12,717,876 B2
(45) Date of Patent: Aug. 25, 2026

(54) ASYNCHRONOUS INTERCORRELATED TIME SERIES DATASETS ALIGNMENT METHOD

(71) Applicants: DOMOHEALTH SA, Lausanne (CH); UNIVERSITÄT BERN, Bern (CH)

(72) Inventors: Narayan Schütz, Bern (CH); Angela Botros, Zürich (CH); Philipp Buluschek, Denges (CH); Guillaume DuPasquier, Belmont-sur-Lausanne (CH); Michael Single, Herzogenbuchsee (CH); Stephan Gerber, Lyss (CH); Tobias Nef, Visp (CH)

(73) Assignees: DOMOHEALTH SA, Lausanne (CH); UNIVERSITÄT BERN, Bern (CH)

( * ) Notice: Subject to any disclaimer, the term of this patent is extended or adjusted under 35 U.S.C. 154(b) by 348 days.

(21) Appl. No.: 18/276,415

(22) PCT Filed: Feb. 8, 2022

(86) PCT No.: PCT/IB2022/051115
§ 371 (c)(1),
(2) Date: Aug. 8, 2023

(87) PCT Pub. No.: WO2022/168064
PCT Pub. Date: Aug. 11, 2022

(65) Prior Publication Data

US 2024/0248954 A1 Jul. 25, 2024

(30) Foreign Application Priority Data

Feb. 8, 2021 (EP) .................................... 21155845

(51) Int. Cl.
*G06F 18/15* (2023.01)
*G06F 123/02* (2023.01)

(52) U.S. Cl.
CPC .......... *G06F 18/15* (2023.01); *G06F 2123/02* (2023.01)

(58) Field of Classification Search
CPC ......... A16B 5/346; A16B 5/296; G06F 18/15; G06F 40/25; G06F 40/70
See application file for complete search history.

(56) References Cited

U.S. PATENT DOCUMENTS

| | | | | |
|---|---|---|---|---|
| 10,339,235 | B1 * | 7/2019 | Ciarlini | G06F 30/20 |
| 2019/0021615 | A1 | 1/2019 | Rundo et al. | |
| 2019/0159735 | A1 * | 5/2019 | Rundo | A61B 5/6893 |

OTHER PUBLICATIONS

International Search Report and Written Opinion for PCT/IB2022/051115, dated Apr. 21, 2022, 11 pgs.

(Continued)

*Primary Examiner* — Lam S Nguyen
(74) *Attorney, Agent, or Firm* — BLANK ROME LLP

(57) ABSTRACT

A computer-implemented method for aligning intercorrelated asynchronous time series datasets includes the steps of:
(a) retrieving a first time series dataset (x) and a second time series dataset (y), the first and second time series dataset being intercorrelated,
(b) segmenting each of the first and second time series dataset (x, y) into a plurality of consecutive smaller segments ($x_i$, $y_i$), all segments of the first and second time series dataset (x, y) having the same length,
(c) determining pairs of corresponding segments by associating successive segments of the first time series dataset (x) with corresponding segments of the second time series dataset (y),
(d) optimizing, for each pair of corresponding segments, a correlation function to obtain an approximation of a first times series transformation function ($f_1$) and of a second time series transformation function ($f_2$),
(e) using the first and second time series transformation functions ($f_1$,$f_2$) to determine a vector of segment (Continued)

Figure 1:
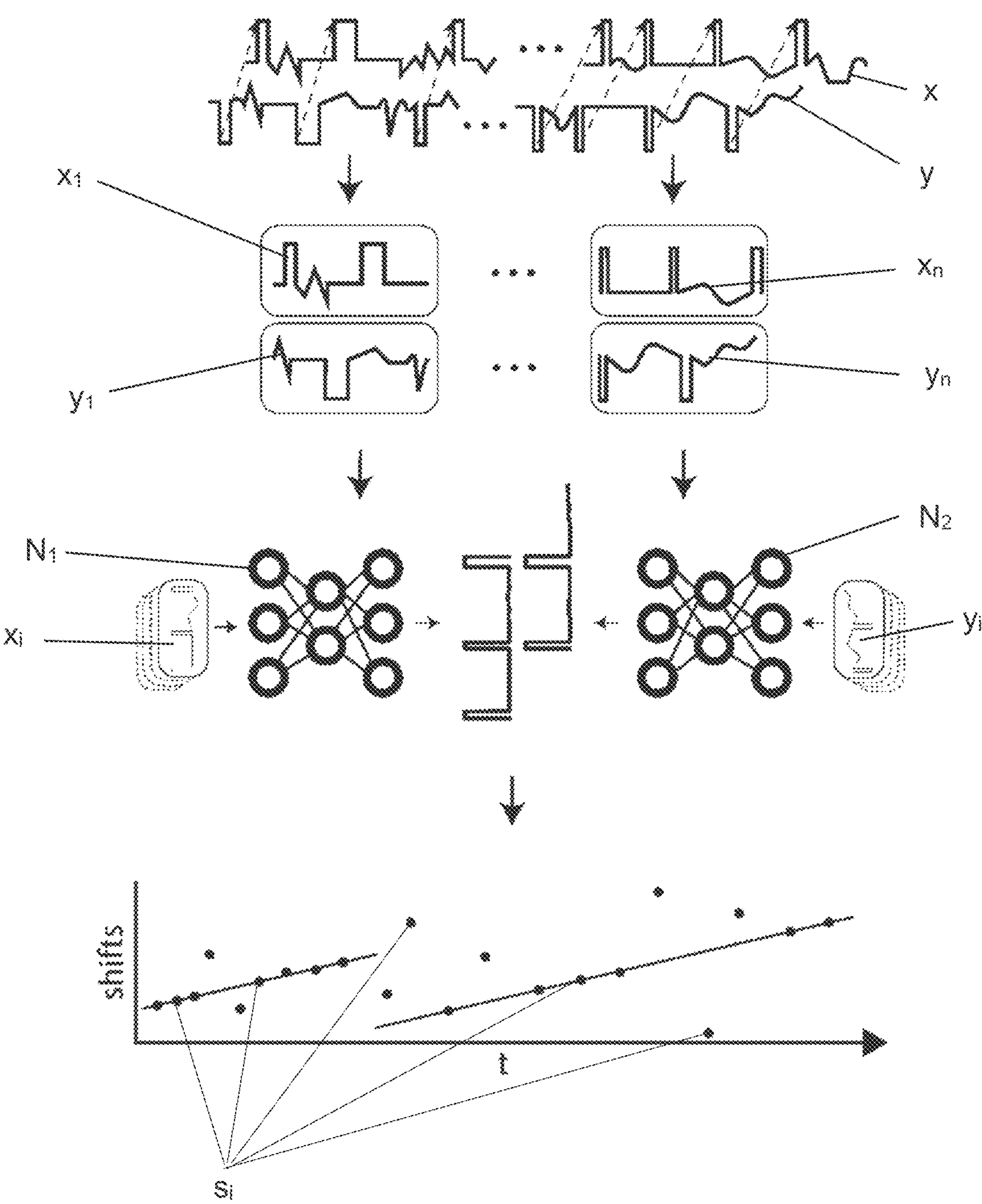

shifts (s) whose components contain approximations of the shifts between the first and the second segment in a pair of corresponding segments ($x_i$, $y_i$), (f) applying a multi-model fitting algorithm to the segment shift vector (s), said multi-model algorithm outputting a shift function ($f^{opt}$) for aligning segments of each pair of corresponding segments ($x_i$, $y_i$), and (g) aligning the first time series dataset (x) with the second series dataset by applying said shift function ($f^{opt}$) to all pairs of corresponding segments ($x_i$, $y_i$), wherein the first time series transformation function ($f_1$) is parametrized by weights ($w_1$) of a first neural network ($N_1$) and outputs a first highly correlated time series dataset, and wherein the second time series transformation function ($f_2$) is parametrized by weights ($w_2$) of a second neural network ($N_2$) and outputs a second highly correlated time series dataset.

12 Claims, 5 Drawing Sheets

(56) References Cited

OTHER PUBLICATIONS

Box George, et al., "Identification, Fitting, an Checking of Transfer Function Models", In: Time Series Analysis—Forecasting and Control, XP055827173; Aug. 31, 2015, pp. 428-431.

* cited by examiner

ASYNCHRONOUS INTERCORRELATED TIME SERIES DATASETS ALIGNMENT METHOD

RELATED APPLICATIONS

This application is a national phase of PCT/IB2022/051115, filed on Feb. 8, 2022, which claims priority to European Patent Application No. EP21155845.7, filed on Feb. 8, 2021. The entire contents of these applications are hereby incorporated by reference.

TECHNICAL DOMAIN

The present invention concerns a computer-implemented method for aligning asynchronous intercorrelated time series datasets.

RELATED ART

The application of sensors in various fields of technology and science has led to an exponential multiplication of timeseries datasets that have to be processed and analysed. The timestamping associated to a time series is usually realized by an internal electronic clock which lies in a sensor measuring a physical event. By the nature of electronic clocks, e.g., using quartz or other oscillator as time source, the clocks can drift with respect to the "real" time and thus towards each other. This makes exact comparison of the two (or more) resulting time series datasets difficult. In the presence of different sensors measuring time series related to a same real-world event or process, the question of synchronization often becomes of utmost importance since the time shift between the clocks of the different sensors can be rather important comparatively to the frequency of the measured signal. Therefore, signals sensed by different devices have to be aligned (i.e. synchronized) in order to be analysed and efficiently compared.

A high precision is required, if the defining features, for instance a peak width, of the time series which needs aligning are of comparable size and frequency as the expected time-shift. Moreover, the obtained time series may be only partially correlated due to the different nature of the measured physiological properties. This often leads to morphologically different time series that are difficult to synchronize with standard alignment methods.

For example, time series (or signals) arising from measuring heartbeats through an electrocardiography or through a ballistocardiography relate to different physiological properties of a same physical event (heartbeats).

On top of that, noises in the time series dataset coming from suboptimal quality of the sensors or from inherent measuring techniques need to be filtered before performing to the alignment of the time series.

Traditional methods of time series alignment are based on Dynamic Time Warping (DTW) and/or Cross-Correlation Lag Analysis (CCLA). In the context of high-frequency time series, DTW tends to collapse time series points together, which does not reflect the reality of sensor signals as they rarely collapse. In addition of that, DTW is not adapted for large time series noise and morphologically strongly different time series datasets. Moreover, CCLA is problematic as it cannot warp the time series, which would be necessary to correct for clock drift/dynamic sampling rates. CCLA is also ill-defined for non-stationary time series and often leads to unexpected/wrong behaviour.

N. SCHÜTZ et al, "Real-World Consumer-Grade Sensor Signal Alignment Procedure Applied to High-Noise ECG to BCG Signal Synchronization*," 2020 42*nd Annual International Conference of the IEEE Engineering in Medicine & Biology Society* (*EMBC*), Montreal, QC, Canada, 2020, pp. 5858-5962, discloses a method for aligning high-frequency time series arising from different biomedical sensors. This method comprises the following four main steps:

1) Measuring two heartbeat-related signals, the first with an ECG (electrocardiograph) and the second with a BCG (ballistocardiograph).
2) Proceeding to a low-resolution alignment by shifting the signals according to an optimal lag found by optimizing the cross-correlation of the two signals.
3) Filtering the signals to remove undesirable parts by "manually" creating and applying a plurality of masks (saturation, large noise, low power) and by applying other filters (forward-backward, Butterworth).
4) Proceeding to a high-resolution alignment by segmenting the filtered signals into small segments and calculating the optimal time lag for each segment using a random sample consensus algorithm.

Step 3) of this method strongly depends on the nature of the input time series as the various masks and filters are built to be adapted to these specific time series. Moreover, the lack of morphological similarity between time series measured with different type of sensors makes the automatization of the process almost impossible with standard time series transformation tools. This strongly limits the versatility of the method from one sensor to another as every sensor stream must have its own set of masks and filters.

Document US 2019/0021615A1 discloses a method for associating specifically an ECG signal to a BCG signal based on a pattern recognition (in particular based on the cross-correlation of the two signals). This method may comprise an optional time-shifting step in order to align the peaks of the ECG and PPG signals. However, the solutions mentioned in this document for realising the time-shifts are traditional CCLA methods and therefore subject to the abovementioned problems. In particular, the segmentation of the datasets in this document has to rely on PPG peak detection to segment individual waveforms. Therefore, implemented and computed, those solutions are strongly dependent on the nature of the input signals and are not easily adaptable to other time series datasets.

There is therefore a need for a time-series dataset time-alignment method which allows to align in time datasets without a priori knowledge of the type of dataset, and/or to align in time datasets which may not show correlation a priori, for example, datasets coming from the measurement of simultaneous physical events but made with two different sensors.

Short Disclosure of the Invention

An aim of the present invention is therefore to provide a computer-implemented method that overcomes the shortcomings and limitations of the state of the art.

In particular, an aim of the present invention is to provide a method for aligning correlated asynchronous time series datasets that is easily adaptable to time series datasets obtained from different sources.

According to the invention, this aim is attained by the object of the attached claims, and especially by the introduction of two neural networks that are trained to filter time series datasets and transform morphologically distinct time series to a common space. Once trained, these neural networks may be adapted for filtering similar time series datasets from other sources of the same type, with no or few external interventions.

More precisely, this aim is attained by a computer-implemented method for aligning intercorrelated asynchronous time series datasets comprising the steps of:

(a) retrieving a first time series dataset (x) and a second time series dataset (y), the first and second time series dataset being intercorrelated, (b) segmenting each of the first and second time series dataset (x, y) into a plurality of consecutive smaller segments ($x_i$, $y_i$), all segments of the first and second time series dataset (x, y) having the same length, (c) determining pairs of corresponding segments by associating successive segments of the first time series dataset (x) with corresponding segments of the second time series dataset (y), (d) optimizing, for each pair of corresponding segments, a correlation function to obtain an approximation of a first times series transformation function (fa) and of a second time series transformation function ($f_2$), (e) using the first and second time series transformation functions ($f_1$,$f_2$) to determine a vector of segment shifts (s) whose components contain approximations of the shifts between the first and the second segment in a pair of corresponding segments ($x_i$, $y_i$), (f) applying a multi-model fitting algorithm to the segment shift vector (s), said multi-model algorithm outputting a shift function ($f^{opt}$) for aligning segments of each pair of corresponding segments ($x_i$, $y_i$), and (g) aligning the first time series dataset (x) with the second series dataset by applying said shift function ($f^{opt}$) to all pairs of corresponding segments ($x_i$, $y_i$), characterized in that the first time series transformation function ($f_1$) is parametrized by weights ($w_1$) of a first neural network ($N_1$) and outputs a first highly correlated time series dataset, and in that the second time series transformation function ($f_2$) is parametrized by weights ($w_2$) of a second neural network ($N_2$) and outputs a second highly correlated time series dataset.

The first and second time series datasets may be respectively a first and a second digital signal.

The method may comprise a step of measuring a first signal with a first sensor and a second signal with a second sensor and converting the first signal into said first digital signal and the second signal into said second digital signal.

The first and second sensors may be biomedical sensors.

The biomedical sensors may be both selected among ECG sensors, BCG sensors, PPG sensors, EEG sensors, EMG sensors and medical accelerometers.

The approximation of said first and second time series transformation functions ($f_1$,$f_2$) may be made by successively fixing the first times series transformation function (fa) to be the identity function while optimizing the second times series transformation function ($f_2$) and then optimizing the first time series transformation function (fa) while fixing the second time series transformation ($f_2$) that has been optimized.

This iterative training allows a filtering of certain segments with low correlation at each step.

The at least one of said first and second neural network may be a residual convolutional neural network with locally constrained receptive fields.

The optimization of said correlation function may comprise a step of optimizing a normalized same cross correlation function.

The optimization of said normalized same cross correlation function may be realized through regular stochastic gradient descent.

At least one of said first and second time series transformation functions ($f_1$,$f_2$) may be non-linear.

The multi-model fitting algorithm may be an energy based multi-model fitting algorithm.

The steps (d) and (e) of the above method may be performed in parallel on a plurality of processors.

With respect to the prior art, the present invention is more flexible as it can be used on a large variety of raw, unfiltered sensor time series as input. In particular, once the transformation are learned, i.e. once the neural networks are trained, the method can be applied to any new sensor inputs from the same kind of sensors or be rapidly retrained for different kind of sensors on the basis of transfer-learning.

SHORT DESCRIPTION OF THE DRAWINGS

Figure 2A:
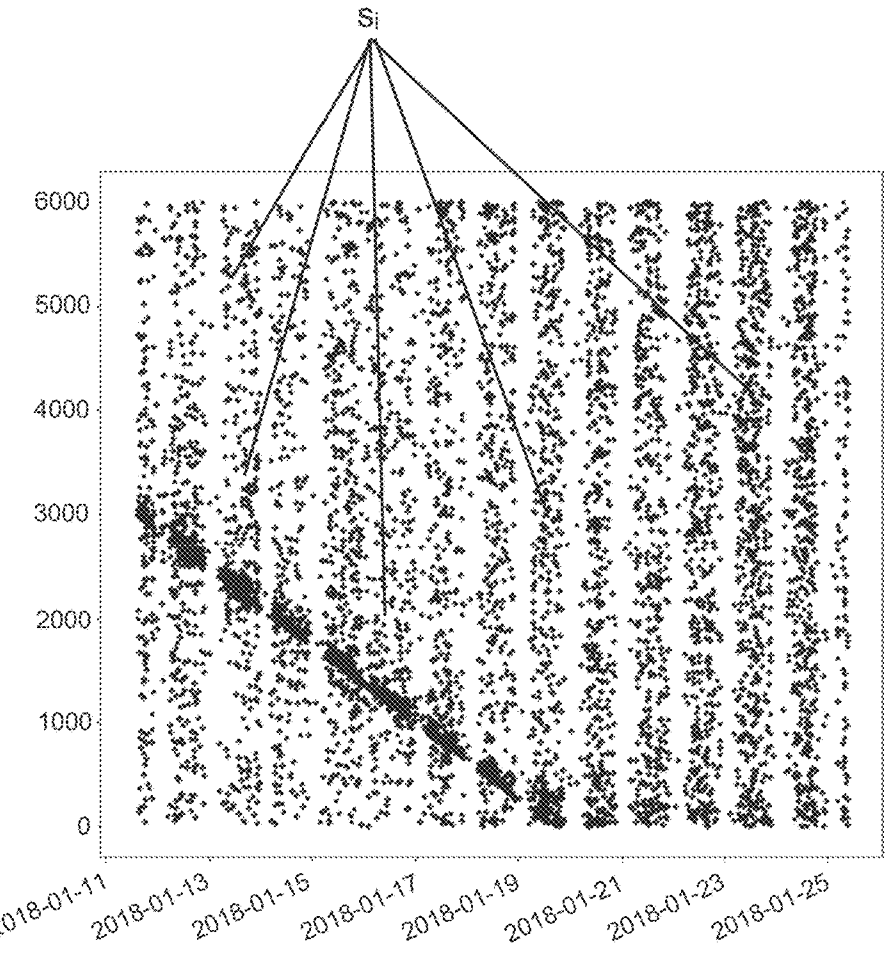
Figure 2B:
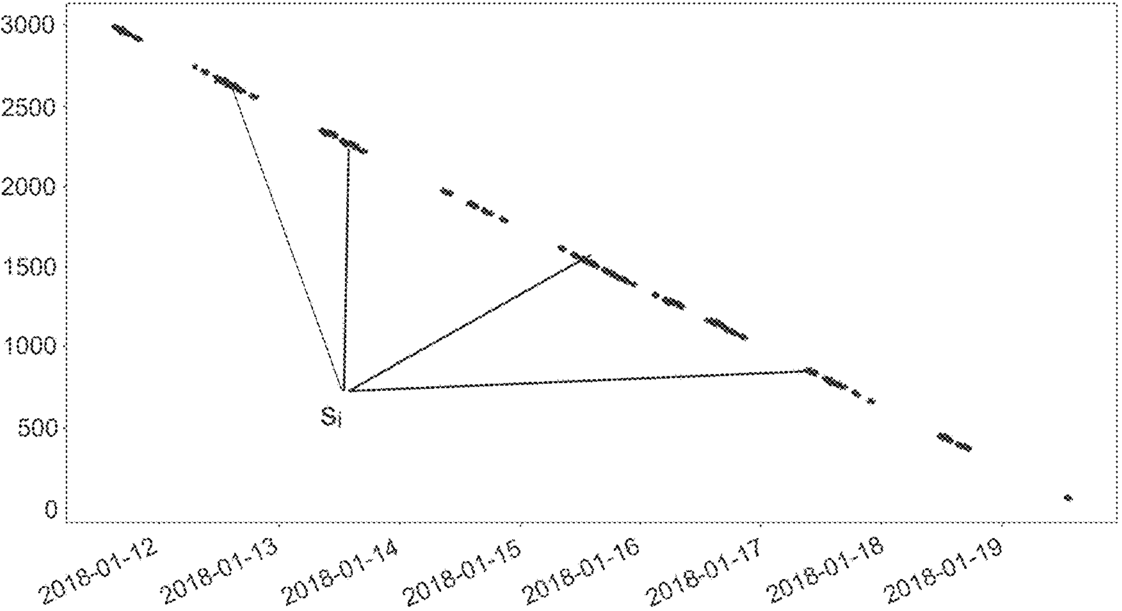
Figure 3A:
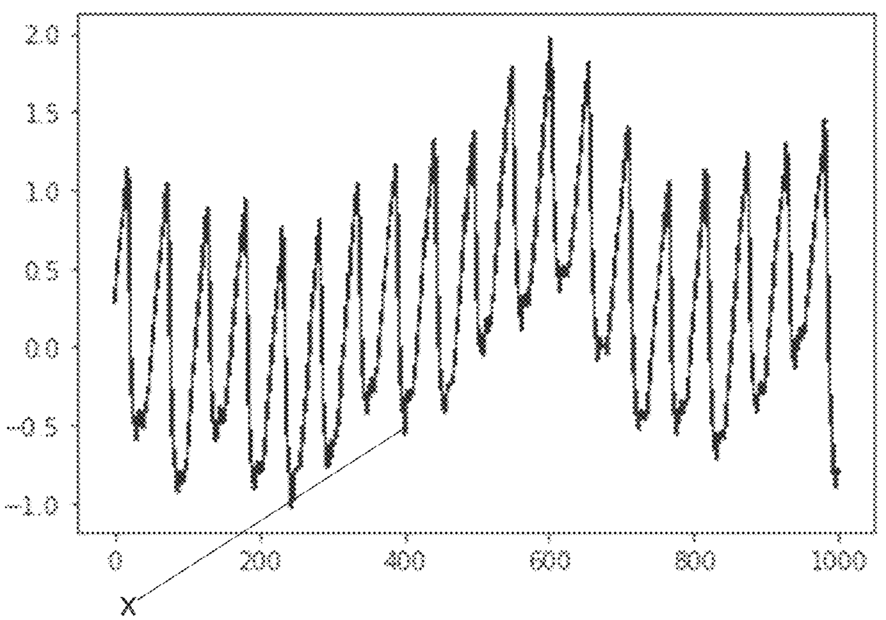
Figure 3B:
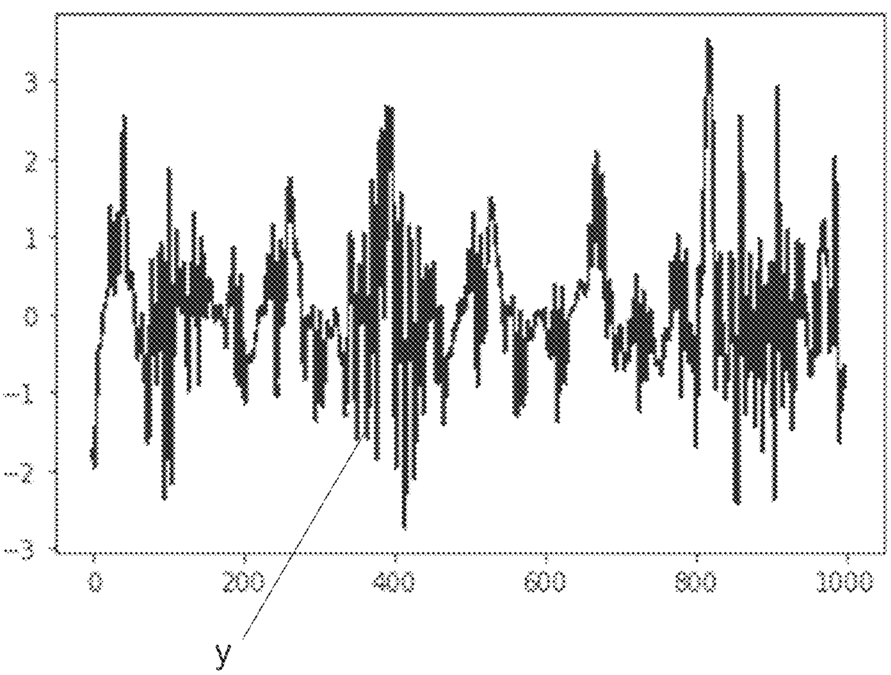
Figure 3C:
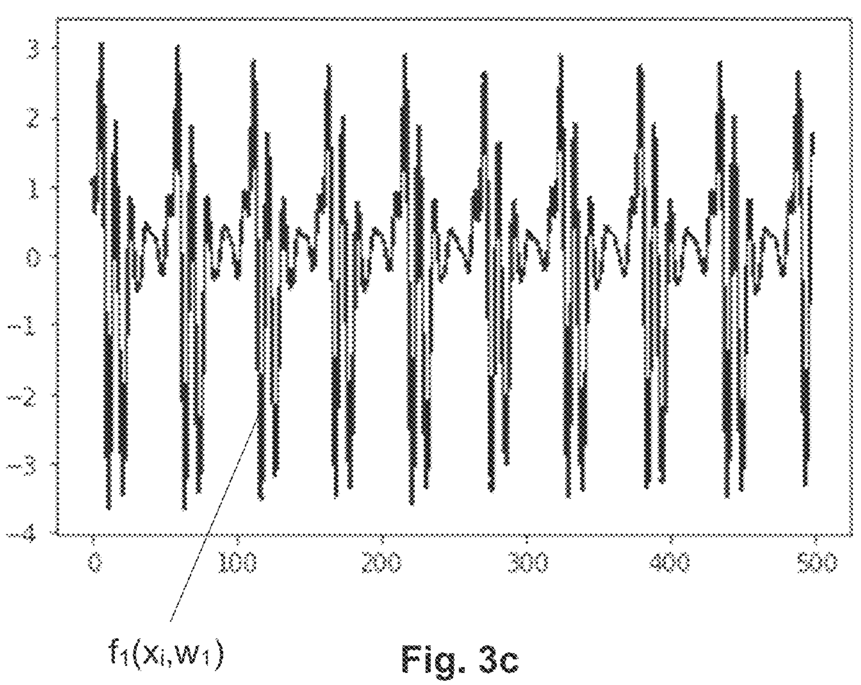

Exemplar embodiments of the invention are disclosed in the description and illustrated by the drawings in which:

FIG. 1 illustrates schematically the main steps of the method;

FIG. 2*a* illustrates a graphic of the shift values before the multi-model fitting step;

FIG. 2*b* illustrates a graphic of the shift values after the multi-model fitting step;

FIG. 3*a* illustrates a graphic of a raw PPG (photoplethysmographic) signal;

FIG. 3*b* illustrates a graphic of a raw BCG (ballistocardiographic) signal;

FIG. 3*c* illustrates an example of the output of a signal transformation function associated to the PPG signal of FIG. 3*a;*

Figure 3D:
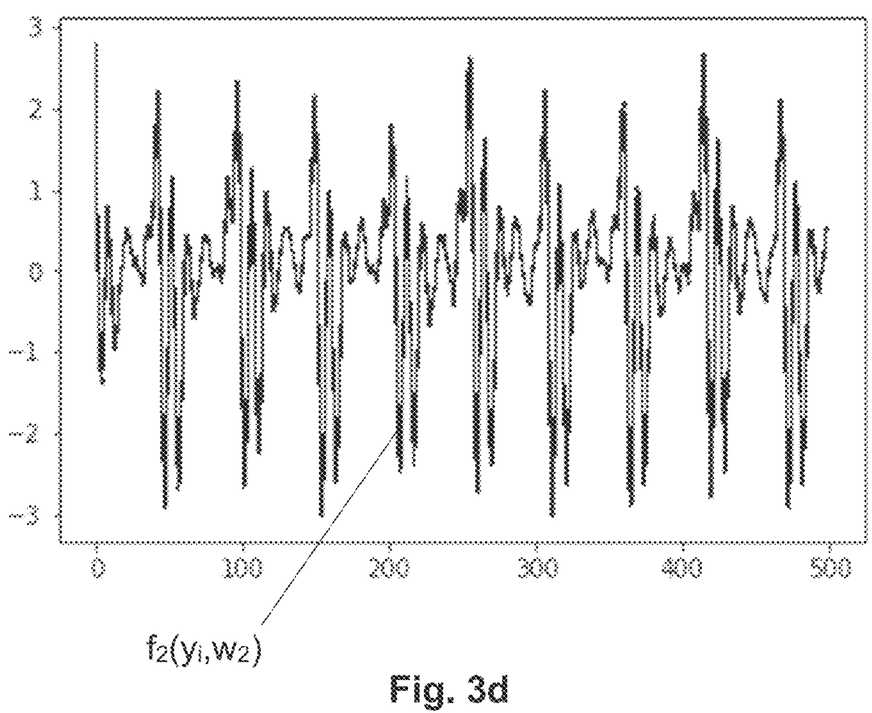
Figure 4:
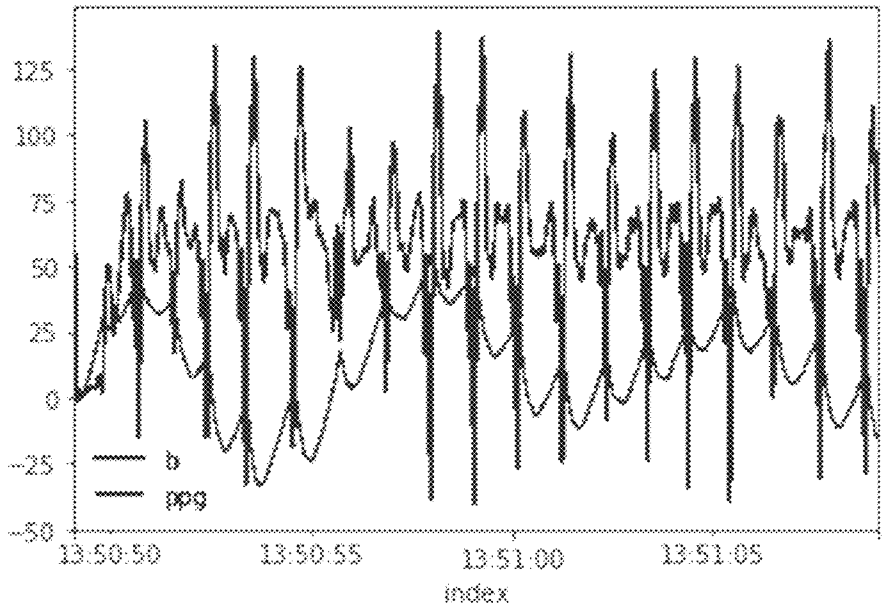

FIG. 3*d* illustrates an example of the output of a signal transformation function associated to the BCG signal of FIG. 3*b*, and FIG. 4 shows a graphic of aligned signals from a 12-leads ECG and an arm-worn device measuring PPG.

DETAILED DESCRIPTION OF THE INVENTION

The present invention relates to a method for aligning asynchronous intercorrelated time series. Misalignment between times series may for example arise from a lack of synchronization between the timestamping mechanisms that assign a time value to a certain measurement. It may also arise from delays inherent to the processes being observed or the technology used. The induced time-shift, or lag, may be constant over certain periods of time, but most often this time-shift is non-constant but piecewise continuous in the sense that over certain periods of time, the lag can be expressed as a continuous function of time. In some cases, this function is periodic, meaning that the lag is identical on certain periods of time, when, for instance, the clocks are regularly reinitialized. In some other cases, this function does not follow any particular pattern as the lag is due to a human interaction. This is typically the case for stock market prices time series where the timestamping depends on the reaction time of an investor.

The variety of fields requiring high-precision time series alignment is rather large and includes for instance:

Manufacturing and heavy industry: with the advent of industry 4.0, predictive maintenance in manufacturing has become key. This is often the result of the combination of measurements (e.g. temperature, pressure, vibration, force, current, voltage, radiation, inductance, etc.) taken continuously by independent sensors on machines at different locations. Predictive maintenance models rely on all these data sources being correctly synchronized, sometimes to a high precision in which case the invention is applicable.

Automotive: self-driving vehicles handle a stream of a variety of sensors as input for decision models. These sensors are currently generally managed centrally from a main processing unit in the vehicle. If these sensors can become independent and rely on their own internal clocks, clock drifts can provide a false correlated information. Here the invention could provide automatic and continuous synchronization.

Sensor calibration and characterization: the invention allows not only to synchronize two signals, but also to characterize the time-based behavior and accuracy across various operating conditions of a sensor with respect to a gold standard. Taking a gold standard as a reference and recording a series of test events through both the gold standard sensor or clock and a second sensor allows using the invention to measure and characterize the accuracy of the second sensor with respect to the gold standard. This can for instance be used for quality control.

Research: many research fields need time series from different sensors to be well synchronized. For instance, experimental physics (CERN), Astronomy, Oceanography (measurement of sound)

Telecommunication, defense & aerospace: all technologies related to Signal Intelligence, notably Radar, HF and microwave communication but also all other type of small size sensors with internal clocks.

In a particular embodiment, a first time series dataset x and a second time series dataset y are retrieved. These time series datasets are supposed to be intercorrelated and they may arise from any of the fields listed above. They may be collected by being retrieved in a time series database or by any other suitable way known to the man skilled in the art.

If needed, the time series datasets are resampled and cropped to a same time period so as to obtain time series datasets of the same length.

The first and second time series datasets are then segmented into a plurality of consecutive smaller segments $x_i$, $y_i$, all segments of the first and second time series dataset x, y having the same length. This allows a distribution of the processing over a plurality of processors, which considerably reduce the computing time. It also allows a processing of comparatively long datasets that would not fit the computer's memory. Then, pairs of corresponding segments are determined by associating successive segments of the first time series dataset x with corresponding segments of the second time series dataset y. In other words, the first segment of the first time series dataset is associated with the first segment of the second time series dataset, the second segment of the first time series dataset with the second segment of the second time series dataset, and so on until all segments are paired. In general, one has to ensure that the length of the smaller segments is comparatively important with respect to the expected time-shift in order to be able to detect the correlation between corresponding segments.

Next, for each pair of corresponding segments, a correlation function is optimized to obtain an approximation of a first times series transformation function $f_1$ and of a second time series transformation function $f_2$, the first time series transformation function $f_1$ being parametrized by weights $w_1$ of a first neural network $N_1$ and the second time series transformation function $f_2$ being parametrized by weights $w_2$ of a second neural network $N_2$. The first and second time series transformation functions $f_1,f_2$ are then used to determine a vector of segment shifts s whose components contain approximations of the shifts between the first and the second segment in a pair of corresponding segments $x_i$, $y_i$.

The training of these transformation functions allows a filtering of the input time series datasets by detecting common patterns as well as transforming morphologically distinct time series datasets into correlated time series datasets. These transformation functions are asked to optimize a cross-correlation function. To efficiently optimize the correlation function, a differentiable normalized same cross correlation (NSCC) is used as loss function. This loss function can then be optimized by regular stochastic gradient descent.

The first and second neural networks $N_1$, $N_2$ output a first and a second filtered and highly correlated time series dataset, and, for each pair of segments, a shift $s_i$ approximating the time shift between the first and the second segment. Because of the noise in the original time series datasets or the time series datasets being only partially correlated, some of the shifts do not correspond to the real misalignment so that a final step of noise tolerant energy based multi-model fitting algorithm is necessary.

The choice of the above loss function is not restrictive and other loss functions could be chosen by a man skilled in the art.

In the embodiment represented in FIG. 1, the training is iterative in the sense that the first transformation function is first trained while the other is fixed. The trained function is then fixed while the other is being trained. At the beginning of the training, the fixed function is set to be the identity function. By doing so, stability problems and overfitting behaviour can be avoided. Moreover, this iterative approach allows to filter out a percentage of segments with low correlation value at each step, which is useful if it is expected that the two time series datasets are only intercorrelated at some points in time.

The choice of neural networks for aligning intercorrelated high-frequency signals strongly depends on the nature of the time series datasets. Both deep and shallow neural networks may be used according to the complexity of the input time series datasets.

In one embodiment, the transformation functions are parametrized by ResNet like convolutional neural networks (convolutional residual neural networks) with locally constrained receptive fields. This type of network architecture is well suited for alignment tasks, allowing for effective computations and adjustment of network capacity based on the network depth.

The optimizing of the cross correlation function also provides, for each pair of segments $x_i$, $y_i$, a time shift value $s_i$. As mentioned before, this shift value may not correspond to the actual misalignment because of the presence of noise in the input time series datasets as well as because of the only partial correlation of the two signals. This problem is solved by further applying an energy based multi-model fitting algorithm to find correction models for each shift value $s_i$. In this particular embodiment, the used algorithm is the PEARL algorithm which combines the optimization of a global discrete energy with an a-expansion algorithm and a recomputing of the proposal models based on the previously found candidates. This provides a piecewise continuous shift function $f^{opt}$ that can be applied to the first and second times series datasets x,y to align every segment $x_i$ onto its corresponding segment $y_i$.

The use of the PEARL algorithm should not be intended as a restriction. Other multi-model fitting algorithm may be chosen by the man skilled in the art.

Biomedical Sensors Embodiments

In some preferred embodiments described hereafter, the time series datasets consist in high-frequency signals that are sensed by biomedical sensors.

In the context of the present disclosure, the term biomedical sensor refers to any type of device that detects a signal of medical relevance such as a change of voltage, a change in light absorption or an acceleration. Electrocardiographs (ECG), ballistocardiographs (BCG), pulse oximeters for performing photoplethysmographies (PPG), all types of electrodes for performing electroencephalographies (EEG), all kind of accelerometers such as wrist or ankle accelerometers, and electromymographs (EMG) are a few examples among many others of biomedical sensors.

The frequency range that is considered in the present disclosure is dependent on the length of the patterns that are observed and on the amount of time-shift happening in the signal. Usually, it is assumed that the relative change of time-shift within a window is negligible. As an example, the heart rate is approximately 1 Hz and its monitoring with standard BCG and ECG typically leads to an observed time-shift of 20 s over 4 hours of measurements. With a window size (i.e. a segment size) of 60 s at sampling frequency of 100 Hz, every window has a relative time-shift of 1.4e-5 s, which is considered to be negligible. Moreover, the intrinsic quality of the sensor control unit which controls the sampling frequency as well as exterior factors like the temperature of the battery levels may induce a time-shift of a few nanoseconds or milliseconds. For these reasons, the term high-frequency refers, in the present disclosure, to frequencies that are in general higher than 1 Hz, but that strongly depend on the measured signal.

In a preferred embodiment represented in FIG. 1, a first and second intercorrelated high-frequency signals x,y are measured with respectively a first and a second biomedical sensor. These signals are converted in a first and second digital signal and possibly resampled so that the first and second digital signals have same length. Both signals are then segmented into a plurality of smaller segments $x_i$,$y_i$ or time-windows, based on their respective sensor time. All the segments have the same length. Pairs of corresponding segments between the first and second signal are determined by associating the first segment of the first digital signal with the first segment of the second digital signal, the second segment of the first digital signal with the second segment digital signal, and so on until all segments are associated.

Each pair of corresponding segments $x_i$, $y_i$ is subsequently input into a first and a second neural network $N_1$,$N_2$ whose respective weights $w_1$,$w_2$ parametrize respectively a first and a second signal transformation functions $f_1$,$f_2$. More precisely, the first segment $x_1$ of the pair is input in the first neural network $N_1$ and the second segment $y_1$ of the pair is input in the second neural network $N_2$. By optimizing a suitable correlation function, the first and second neural networks output a first and a second filtered and highly correlated signals, and, for each pair of segments, a shift $s_i$ approximating the time shift between the first and the second segment. Because of the noise in the original signals or the signals being only partially correlated, some of the shifts do not correspond to the real signal misalignment so that a final step of noise tolerant energy based multi-model fitting algorithm is necessary.

In this embodiment, the original raw digital signals x, y are typically of same length T. They are both divided into n smaller segments $x_i$, $y_i$ that are also of a fixed same length, say m so that T=m×n. This subdivision allows to work with long signals that would not fit into the computer memory. Moreover, it allows a distribution of the alignment workload across multiple processors which considerably reduces the computing time.

As previously mentioned, in the embodiment represented in FIG. 1, each segment of a pair of corresponding segments $x_i$,$y_i$ is input into a neural network. Weights $w_1$ of the first neural network $N_1$ are used to parametrize the first transformation function fa, and similarly the second neural network $N_2$ has weight $w_2$ used to parametrize the second transformation function $f_2$. This means that $f_1(x_i,w_1)$ and $f_2(y_i,w_2)$ are new signals obtained from two segments $x_i$,$y_i$ by applying possibly non-linear transformations. The two neural networks $N_1$, $N_2$ are then trained iteratively to optimize the two transformation functions $f_1$,$f_2$. The training of these transformation functions allows a filtering of the first and second input signals x, y by detecting common patterns as well as transforming morphologically distinct signals into correlated signals. These transformation functions $f_1$, $f_2$ are asked to optimize a cross-correlation function to approximate time-shifts between corresponding segments $x_i$,$y_i$. To efficiently optimize the correlation function, a differentiable normalized same cross correlation (NSCC) is used as loss function. This loss function can then be optimized by regular stochastic gradient descent.

The choice of the above loss function is not restrictive and other loss functions could be chosen by a man skilled in the art.

In the embodiment represented in FIG. 1, the training is iterative in the sense that the first transformation function $f_1$ is first trained while the second transformation function $f_2$ is fixed. The trained function is then fixed while the other is being trained. At the beginning of the training, the fixed function is set to be the identity function. By doing so, stability problems and overfitting behaviour can be avoided. Moreover, this iterative approach allows to filter out a percentage of segments with low correlation value at each step, which is useful if it is expected that the two signals are only intercorrelated at some points in time.

The choice of neural networks for aligning intercorrelated high-frequency signals strongly depends on the nature of the signals. Both deep and shallow neural networks may be used according to the complexity of the input signals.

In one embodiment, the transformation functions are parametrized by ResNet like convolutional neural networks (convolutional residual neural networks) with locally constrained receptive fields. This type of network architecture is well suited for alignment tasks, allowing for effective computations and adjustment of network capacity based on the network depth.

In the embodiment illustrated in FIG. 1, the optimizing of the cross correlation function also provides, for each pair of segments $x_i$, $y_i$, a time shift value $s_i$. As mentioned before, this shift value may not correspond to the actual misalignment because of the presence of noise in the input signals as well as because of the only partial correlation of the two signals. In addition, this shift value is discrete and only sampled once for every segment. To find a piecewise continuous correction function, a robust multi-model fitting algorithm is used which allows to correctly resample each data point in the original signal y. In this particular embodiment, the used algorithm is the PEARL algorithm which combines the optimization of a global discrete energy with an a-expansion algorithm and a recomputing of the proposal models based on the previously found candidates. Applying this algorithm to a vector s made of the shift values $s_i$ provides a piecewise continuous function $f^{opt}$ which can be applied to a segment $x_i$ of a pair of segments $x_i$, $y_i$ to align it onto its corresponding segment $y_i$. The term piecewise continuous means that $f^{opt}$ is a continuous function on each individual segment of the original digital signal x, but not necessarily between two successive segments.

The use of the PEARL algorithm should not be intended as a restriction. Other multi-model fitting algorithm may be chosen by the man skilled in the art.

In a particular embodiment the two sensors are accelerometers, the first being worn on the right wrist and the second on the right ankle. Since the movements of the wrist and the movements of the ankle are only partially correlated, it follows that the corresponding signals as partially correlated as well. FIG. 2*a* shows the shift values $s_i$ before applying the multi-model fitting algorithm and FIG. 2*b* shows the shift values that were used to fit function $f^{opt}$, demonstrating the approach's robustness towards high degrees of noise. In both FIGS. 2*a* and 2*b*, the x-axis is the time axis labelled with dates of signal measurement, and the y-axis is the time-shift axis in 10-millisecond steps.

In another embodiment, a first raw signal x, represented in FIG. 3*a* is a PPG signal and a second raw signal y, represented in FIG. 3*b*, is a BCG signal. FIG. 3*c* and FIG. 3*d* illustrate examples of signal output $f_1(x,w_1)$, $f_2(y,w_2)$ of the two transformation functions $f_1,f_2$. The x-axis of FIG. 3*a-d* is the time axis, and the y-axis corresponds to the amplitude of the signal.

In yet another embodiment, a signal is measured with a 12-leads ECG and a second PPG signal measured with an arm-worn device. FIG. 4 shows the two signals after their complete alignment. The x-axis is the time axis labelled by the measurement time and the y-axis corresponds to the amplitude of the signals.

The invention claimed is:

1. A computer-implemented method for aligning intercorrelated asynchronous time series datasets comprising the steps of:

(a) retrieving a first time series dataset and a second time series dataset, the first and second time series dataset being intercorrelated, (b) segmenting each of the first and second time series dataset into a plurality of consecutive smaller segments, all segments of the first and second time series dataset having the same length, (c) determining pairs of corresponding segments by associating successive segments of the first time series dataset with corresponding segments of the second time series dataset, (d) optimizing, for each pair of corresponding segments, a correlation function to obtain an approximation of a first times series transformation function and of a second time series transformation function, (e) using the first and second time series transformation functions to determine a vector of segment shifts whose components contain approximations of the shifts between the first and the second segment in a pair of corresponding segments, (f) applying a multi-model fitting algorithm to the segment shift vector, said multi-model algorithm outputting a shift function for aligning segments of each pair of corresponding segments, and (g) aligning the first time series dataset with the second series dataset by applying said shift function to all pairs of corresponding segments, wherein the first time series transformation function is parametrized by weights of a first neural network and outputs a first highly correlated time series dataset, and wherein the second time series transformation function is parametrized by weights of a second neural network and outputs a second highly correlated time series dataset.

2. Method according to claim 1, wherein said first and second time series datasets are respectively a first and a second digital signal.

3. Method according to claim 1, further comprising a step of measuring a first signal with a first sensor and a second signal with a second sensor and converting the first signal into said first digital signal and the second signal into said second digital signal.

4. Method according to claim 3, wherein said first and second sensors are biomedical sensors.

5. Method according to claim 4, wherein said biomedical sensors are both selected among ECG sensors, BCG sensors, PPG sensors, EEG sensors, EMG sensors and medical accelerometers.

6. Method according to claim 1, wherein said approximation of said first and second time series transformation functions is made by successively fixing the first times series transformation function to be the identity function while optimizing the second times series transformation function and then optimizing the first time series transformation function while fixing the second time series transformation that has been optimized.

7. Method according to claim 1, wherein at least one of said first and second neural network is a residual convolutional neural network with locally constrained receptive fields.

8. Method according to claim 1, wherein said optimizing of said correlation function comprises a step of optimizing a normalized same cross correlation function.

9. Method according to claim 8, wherein said optimizing of said normalized same cross correlation function is realized through regular stochastic gradient descent.

10. Method according to claim 1, wherein at least one of said first and second time series transformation functions is non-linear.

11. Method according to claim 1, wherein said multi-model fitting algorithm is an energy based multi-model fitting algorithm.

12. Method according to claim 1, wherein step (d)-(e) is performed in parallel on a plurality of processors.

* * * * *